June 13, 1939.　　　G. C. ARMSTRONG　　　2,162,521
CONTROL DEVICE
Filed April 30, 1937　　　2 Sheets-Sheet 1

WITNESSES:
Wm. B. Sellers.
H. C. Hepler.

INVENTOR
George C. Armstrong.
BY
W. R. Coley
ATTORNEY

June 13, 1939.　　　G. C. ARMSTRONG　　　2,162,521
CONTROL DEVICE
Filed April 30, 1937　　　2 Sheets-Sheet 2
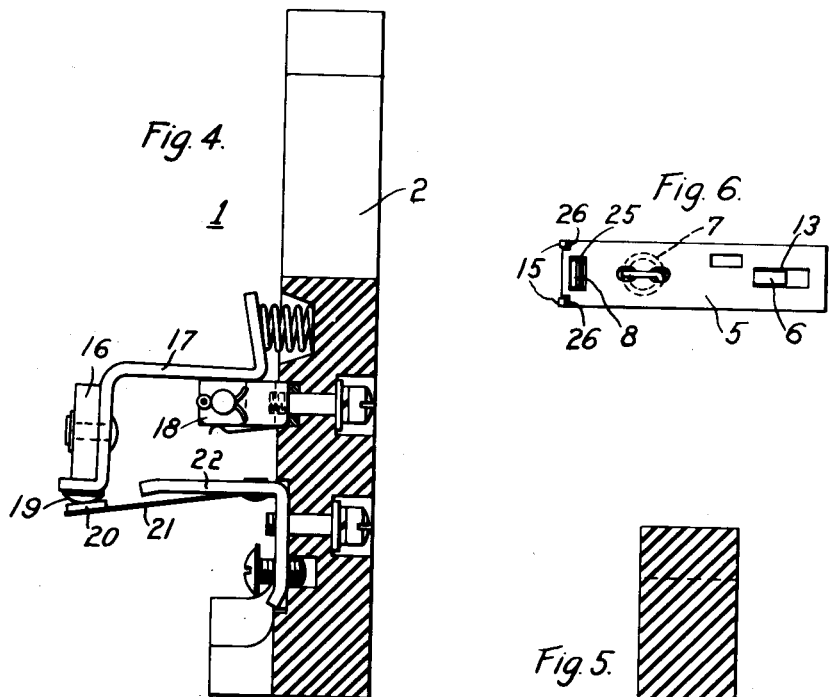
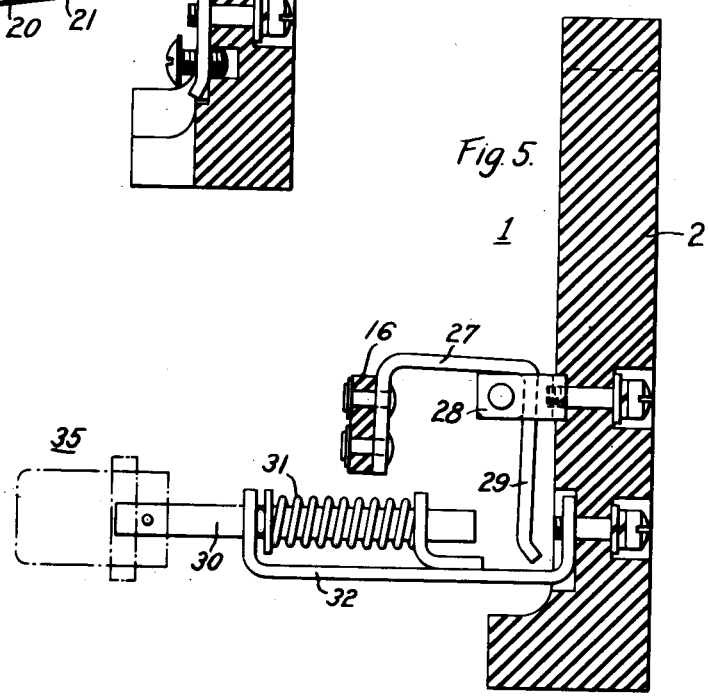
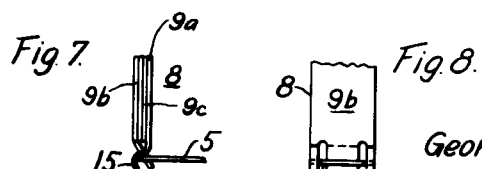
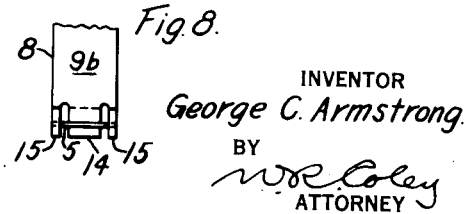
WITNESSES:
INVENTOR
George C. Armstrong.
BY
ATTORNEY Patented June 13, 1939

2,162,521

UNITED STATES PATENT OFFICE 2,162,521

CONTROL DEVICE

George C. Armstrong, Forest Hills, Pa., assignor to Westinghouse Electric & Manufacturing Company, East Pittsburgh, Pa., a corporation of Pennsylvania Application April 30, 1937, Serial No. 139,976

5 Claims. (Cl. 200—116)

My invention relates to control devices and more particularly to heat-responsive control devices for actuating overload relays, circuit-breaker-trip devices, measuring or indicating instruments or the like.

To increase the operating time of a bimetallic heat-responsive element, it becomes necessary to increase its mass so that it will take longer for such element to change its effective temperature. If the mass of a bimetallic element is increased by merely increasing the thickness thereof, the heat necessary for the operation of such an element will likewise be increased for a given length of such element. This condition would then require an increased wattage for a given length or would require an increased length with the same heat supply to produce a given deflection. However, since the physical characteristics of those devices which use a bimetallic element limit either the size of such element or the heat supplied to such element, it has been apparent to the art that such limitations have been restricting the adaptability of such bimetallic heat-responsive elements.

These limitations have been exceptionally true in the circuit breaker art where the necessity of having a small compact powerful bimetallic element capable of withstanding the necessary temperature rises on overloads and of having sufficient deflection has been apparent for some time. Likewise with thermal overload relays, it has been apparent that a heat-responsive device capable of operating upon the same wattage, but with a longer operating time, has been definitely needed.

It is accordingly an object of my invention to provide a bimetallic heat-responsive device which will be small, compact, and powerful, and which will be capable of withstanding sudden rises in temperature before deflecting an appreciable amount, and while deflecting will produce a force greater than the average device.

A further object of my invention is to provide an improved bimetallic heat-responsive device which will have a delayed or longer operating time for a given heat supply than those devices now known to the art.

A further object of my invention is to provide means whereby the operating time of a bimetallic heat-responsive device may be varied at the will of the designer without changing the heat supply or connections to the power supply.

A further object of my invention is to provide a bimetallic heat-responsive device which will be capable of readily overcoming the operating friction of a thermal relay, circuit-breaker or the like.

A further object of my invention is to provide means whereby the bimetallic heat-responsive device of a thermal relay may have a knife edge contact with a trip member and whereby there shall be no lost operating motion between the bimetallic heat-responsive device and the trip member.

Other objects of my invention will either be pointed out specifically in the course of the following description of a device embodying my invention, or will be apparent from such description.

In the accompanying sheets of drawings:

Figs. 4 and 5 are sectional views of the device of Fig. 1 taken along line IV—IV and line V—V, respectively;

Fig. 6 is a partial sectional view of the device of Fig. 2 taken along line VI—VI thereof;

Fig. 7 is a partial elevational view of a device embodying my invention; and

Fig. 8 is a side elevational view of the device of Fig. 7.

Figure 1:
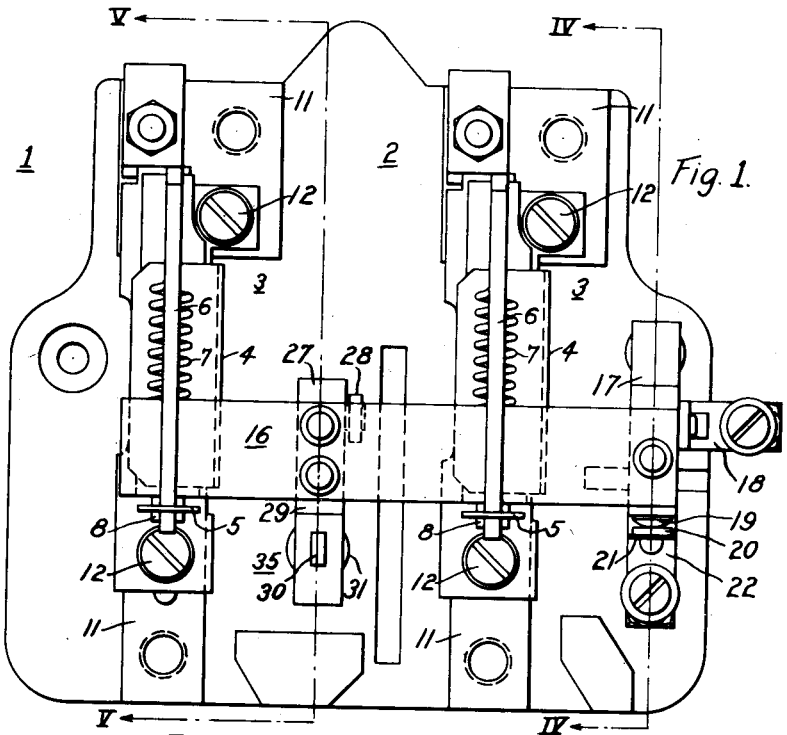
Figure 1 is a plan view of a device embodying my invention.

Referring to the drawings, I show a thermal overload relay 1 comprising a base 2, a plurality of heat-responsive devices 3, a cross-bar 16, control circuit contact members 19—20 operatively associated therewith, and a manual resetting device 35.

Figure 3:
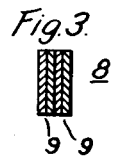
Fig. 3 is an enlarged sectional view of the device of Fig. 2 taken along line III—III thereof.

The heat-responsive devices 3 may comprise a channel-shaped radiant heater 4 removably attached to terminal blocks 11 by means of shoulder screws 12, a latch or trip device 5, an element mounting trip-restraining member or bracket 6, a resilient member 7 and a composite bimetallic device or structure 8, comprising a plurality of separate bimetallic elements 9 (see Fig. 3). The bimetallic structure 8 may be rigidly attached to the trip-restraining member 6 by means of rivets 10, and may be located within the channel-shaped radiant heater 4.

It is to be understood that the radiant heater 4 and the bimetallic structure 8 may be located within the presence of any desirable insulating fluid such as air, oil, or a controlled atmosphere, and that such bimetallic structure will flex in response to the heated circumambient fluid. The trip device 5 may be removably mounted upon the free end of the bimetallic structure 8 and may be held in swingable relation thereto by means of the resilient member or helical spring 7 attached at one end to the trip device and at the other end to the trip restraining bracket 6. The trip device 5 is held by spring 7 substantially normal to base 2 due to the action of a notched neck portion 24 of the trip restraining bracket 6 which is located within an aperture 13 in the said trip device.

The cross-bar 16 may be swingably mounted upon the base 2 by means of brackets 17 and 27, which may be rotatably mounted upon brackets 18 and 28, respectively. A contact 19 may be rigidly attached to the bracket 17 and may engage a contact 20 rigidly attached to the free end of a flexible finger 21, which in turn may be rigidly attached to the bracket 22.

While the bimetallic structure 8 flexes outwardly or away from the trip-restraining member 6, due to the heat radiated from heater 4, the trip device 5 is likewise moved from the trip-restraining member 6 along its neck portion 24 and toward the base 2 until the aperture 13 becomes free of the neck portion 24, which, in turn, permits the resilient member 7 to pull the trip device 5 upwardly along the trip-restraining bracket 6. While moving along the trip-restraining bracket, the trip engages the cross-bar 16 and due to the action of the said resilient member 7 upon such trip device 5, the cross-bar 16 is carried along with the trip device. When the cross-bar 16 has been swung upwardly, as hereinabove described, the brackets 17 and 27 are correspondingly rotated about the brackets 18 and 28, respectively, and due to such action the contact 19 becomes disengaged from the contact 20, while an extended portion 29 of bracket 27 contacts a manual reset plunger 30 slidably mounted upon bracket 32 of the manual resetting device 35.

To reset and reestablish contact between the contacts 19 and 20, the plunger 30 of the manual resetting device 35 is forced downwardly against the action of a resilient member 31, causing the extended portion 29 of bracket 27 to return to its normal position substantially parallel to the base 2. Simultaneously with such action, the cross-bar 16 is returned to its normal operating position, reengaging contacts 19 and 20, and resetting the trip device 5 upon the neck portion 24 of the trip restraining device 6.

When the channel-shaped radiant heaters 4 are operatively connected with a power circuit by means of terminal blocks 11 and shoulder screws 12, the heat radiated therefrom is substantially proportional to the power fluctuations of such circuit. Consequently, the bimetallic structures 8, being located within the respective radiant heaters 4, will likewise respond to the power fluctuations of such circuit. Upon connection of the control-circuit contact members 19—20 with a main power circuit controlling device (not shown), it is obvious that such control-circuit contact members will be controlled by the fluctuations of the main power supply due to the heat output of the radiant heaters 4.

To adapt a thermal relay, as hereinabove described, to the characteristics of various power circuits, it has been the practice to connect the radiant heaters 4 of such relays to such power circuits by means of saturating current transformers. By the use of such transformers, the amount of power directly applied to the radiant heaters 4 may be adjusted to the requirements of the particular circuit and relay. Consequently, the relay may operate with any set time characteristic for a given load or upon a delayed time characteristic with the same load, providing the transformers or the heaters operatively associated therewith have been correspondingly changed.

To overcome the objection of having to incorporate a bulky costly transformer in cooperation with a thermal relay, or the necessity of having to change such transformers my invention provides means whereby the operating characteristics of the bimetallic structure 8 may be easily and readily changed and in such a manner I arrive at the desired solution.

Figure 2:
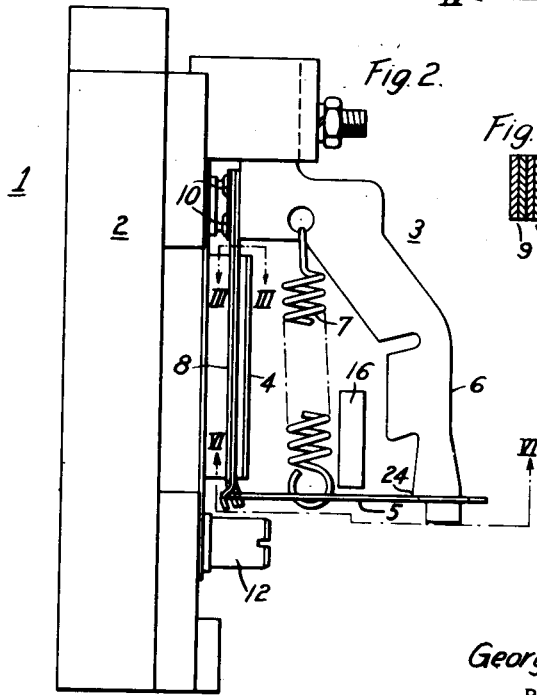
Fig. 2 is a side elevational view of the device shown in Fig. 1.

To achieve the desired result through changing the operating characteristics of the bimetallic structure 8, I provide a plurality of such bimetallic elements or strips 9 (see Fig. 3) assembled to form a composite bimetallic structure 8 with such strips arranged in face-to-face engagement so that they shall all flex in the same direction with fluctuations in temperature, the free ends of such bimetallic elements 9 being permitted to slide one over the other as the elements are flexed. The force exerted by such composite structure will be substantially the sum of the forces exerted by the individual bimetallic elements 9. By rigidly attaching the stationary ends of such bimetallic elements 9 to a common support, such as by means of rivets 10 to the trip-restraining member 6, as shown in Fig. 2 the mass of such bimetallic members will be increased, depending upon the number of elements 9, and the time required for such bimetallic structure 8 to arrive at its operating temperature will be delayed. The increase in operating time of such a composite bimetallic structure over that of its constituent elements will be substantially proportional to the number of such elements. Should the structure be composed of two elements its operating time would be substantially double that of the single element for a given temperature, and if composed of three elements its operating time would be substantially triple that of the single element.

While in the prior art the mass of a single bimetallic element has been increased by changing some dimension thereof, the operating temperature thereof was likewise increased. This increase in operating temperature is required to produce a given deflection thereof in the case of a thick element due to the inherent characteristics of such an element which deflects less for a given temperature than a thin element.

As regards the prior art suggestion of increasing the mass of a single bimetallic element by increasing the width thereof, the radiating surface in that case was likewise increased, which in turn required an increase in watts or temperature for a given deflection.

However, by having the bimetallic structure 8 composed of a plurality of separate bimetallic strips or elements as herein provided, the composite bimetallic structure will flex or deflect a distance equal to that which the individual element 9 would deflect for the same temperature, and since each element is located in juxtaposition with its adjacent element in face-to-face engagement and operating in a similar direction, the force developed by the composite member will be approximately the sum of the forces of each individual element.

Moreover, the additional force developed by the composite bimetallic structure 8 over that of a single element enables the thermal relay to operate freely and to overcome the possibility of jerky operation due to the friction developed between the moving parts thereof, such as the neck portion 24 of the trip-restraining device 6 and the trip device 5 of the relay hereinabove described. Such a construction thus permits the development of a relay that will operate smoothly upon any precalculated setting, and, therefore, that may be calibrated more closely and that will not deviate from such calibration.

By incorporating a composite bimetallic structure 8, as hereinabove described, in cooperation with the thermal overload relay 1, it is obvious that such relay will operate in conjunction with a power circuit with a delayed time of operation. Consequently such a relay will not interrupt the power circuit upon a momentary overload, providing such overload is not above a precalculated dangerous value, as hereinafter more fully described, due to the delayed time action of the bimetallic element 8.

Referring to Figs. 6, 7 and 8, I show a composite bimetallic member having an inside bimetallic element 9a, an outside element 9b, and an intermediate element 9c. Inside element 9a has a plurality of ears 15 at the corners of the illustrated lower or free end thereof which are bent outwardly and upwardly, substantially as shown in Fig. 7, to engage the end of the trip device 5 within notches 26, located in the corners thereof, as shown in Fig. 6. The outside element 9b has a simple central tongue portion 14 extending from the illustrated lower or free end thereof which is bent inwardly and upwardly, substantially as shown, to engage the tripping device through an aperture 25. The intermediate elements 9c, if used, may or may not have either a tongue or ear. However, it is preferred that they be cut a little shorter than the elements 9a and 9c and be void of both tongue and ears. It is, therefore, apparent that the tongue 14 in combination with the ears 15 form substantially a V into which the trip device 5 may be placed, and due to the action of the resilient member 7 upon the trip device 5 such device will be clamped or held firmly within the V.

By having the outside edge of the aperture 25, or that edge of the aperture farthest from the trip-restraining bracket 6, and the inside edges of the notches 26, or those edges nearest to the trip-restraining bracket 6, substantially in a straight line and the planes of such edges substantially normal to the surface of the trip device 5, such device, when placed within the V formed by the tongue 14 and ears 15, will have a line or knife edge contact with the composite bimetallic structure; namely, the tongue 14 will contact the outside of aperture 25 and ears 15 will contact the inside of notches 26. By having the tongue 14 a part of the outside element 9b, the total force exerted by the elements 9a, 9b and 9c, that is by the composite structure 8, away from the trip-restraining bracket 6 will be applied to the trip device 5 through element 9b and tongue 14. When the action of the bimetallic member is in the opposite direction, the total force supplied by the elements 9b, 9c and 9, that is by the composite structure 8, will be imposed upon element 9a and through the ears 15 integral therewith to the trip device 5.

Due to the action of the resilient member 7 biasing the trip device 5 permanently within the V formed by the tongue 14 and ears 15, one end of such device will have a rather tight fit therein. However, due to the presence of the knife-edge contact between the bimetallic structure 8 and the trip device 5, such device may readily rotate within the V. Due to the tight fit between the trip device 5 and the bimetallic member 8, movements of such bimetallic member will be accurately transmitted to the trip device. This tight fit and knife-edge contact between the trip device 5 and bimetallic member 8 thus permits the relay in which this structure is embodied to be accurately calibrated and ensures a continuation of such calibration.

It is to be understood that either the tongue 14 or the ears 15 may or may not be located upon the free ends of all of the bimetallic elements 9. However, if more than one element has ears located thereon, those ears nearest to the restraining bracket 6 are to be in contact with the trip device 5, so that the cumulative force of the remaining elements will be applied to move the trip device toward the bracket 6, and if more than one element has a tongue thereon, the element farthest from the bracket 6 is to be in contact with the trip device so that the total force of the composite bimetallic structure 8 will be applied to move the trip device 5 away from the bracket 6 by only one tongue 14.

It is, therefore, obvious that by using a thermal relay in which the trip device is relatively tightly clamped to the heat-responsive device so that such trip device will be permitted to swing only about the free end of the heat-responsive device and not be permitted relative transverse movement, in respect thereto, the ability to obtain and retain an accurate, fixed calibration of the thermal relay will be increased.

It is likewise obvious that by using a thermal overload relay, as hereinabove described, in cooperation with rotating electrical apparatus, or any other apparatus in which it is necessary to have an extremely heavy starting current, the application of such relay will adequately permit the starting of the apparatus without the necessity of saturating current transformers. In other words, the operating characteristics of the bimetallic member 8 will approach or may be made to approach the temperature characteristics of the operating coils of such apparatus, and accordingly disconnect such apparatus from its power supply only when such coils therein have increased in temperature to the precalculated danger point.

Various modifications may be made in the device embodying my invention without departing from the spirit and scope thereof, and I desire that only such limitations shall be placed thereon as are imposed by the prior art and the appended claims.

I claim as my invention:

1. A thermal relay comprising a support, a circuit-maker-and-breaker, a trip device, a heat-responsive composite control device comprising a plurality of bimetallic elements, means for securing said elements to said support in face-to-face engagement permitting unrestricted flexing of the elements in the same direction so that the force exerted by said composite device in flexing is substantially the sum of forces exerted by the individual bimetallic elements, means for retaining the trip device in its open position, and means for biasing and swingably mounted the trip device upon the free ends of the bimetallic elements, whereby as such elements flex the trip device will become disengaged from said retaining means and due to the action of the biasing means will operate the circuit-maker-and-breaker.

2. In a circuit-controlling device, a stationary structure, a heat-responsive device comprising a plurality of bimetallic elements disposed in face-to-face engagement, a finger attached to the end of each of said elements, said fingers comprising substantially a V, a trip device, and a resilient member operatively associated therewith to hold said trip device in engagement with both said V and said stationary structure.

3. In a circuit-controlling device, a stationary structure, a heat-responsive device comprising a plurality of bimetallic elements disposed in face-to-face engagement, a finger attached to the end of each of said elements, said fingers comprising substantially a V, a trip device, and a resilient member operatively associated therewith to hold said trip device in engagement with both said V and said stationary structure, said trip device loosely engaging said stationary structure and being swingable along the same around said V.

4. In a circuit-controlling device, a stationary structure, a heat-responsive device comprising a plurality of bimetallic elements disposed in relatively slidable face-to-face engagement, a trip device swingably attached to said heat-responsive device and loosely engaging said stationary structure, and a resilient member having one end attached to said structure and the other to a part of said trip device intermediate its points of engagement with said heat-responsive device and said stationary structure.

5. A thermal relay comprising movable contact means, a trip device therefor, a heat-responsive device comprising a plurality of bimetallic elements disposed in relatively slidable face-to-face engagement and having a pivotal engagement with said trip device, and means loosely engaging said trip device and resilient means cooperating with said loosely engaging means to retain the trip device out of engagement with said movable contact means, the flexing of said bimetallic elements under the influence of heat effecting disengagement of said trip device from said loosely engaging means whereby said resilient means biases said trip device into moving engagement with said movable contact means.

GEORGE C. ARMSTRONG.